(12) United States Patent
Suzuki (10) Patent No.: US 8,459,401 B2
(45) Date of Patent: Jun. 11, 2013

(54) STEERING APPARATUS

(75) Inventor: Toru Suzuki, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 383 days.

(21) Appl. No.: 12/742,059

(22) PCT Filed: Oct. 29, 2008

(86) PCT No.: PCT/IB2008/002875
§ 371 (c)(1),
(2), (4) Date: May 7, 2010

(87) PCT Pub. No.: WO2009/060277
PCT Pub. Date: May 14, 2009

(65) Prior Publication Data
US 2010/0243368 A1 Sep. 30, 2010

(30) Foreign Application Priority Data
Nov. 8, 2007 (JP) .................. 2007 291319

(51) Int. Cl.
*B62D 1/18* (2006.01)
*B62D 5/04* (2006.01)
(52) U.S. Cl.
USPC ........................... 180/444; 180/443; 280/775
(58) Field of Classification Search
USPC ............ 74/493; 180/443, 444, 446; 280/775, 280/779, 780
See application file for complete search history.

(56) References Cited

U.S. PATENT DOCUMENTS

| 6,345,842 | B1 * | 2/2002 | Igarashi et al. | 280/775 |
| 7,198,296 | B2 * | 4/2007 | Sadakata et al. | 280/775 |
| 7,413,222 | B2 * | 8/2008 | Higashino et al. | 280/775 |
| 7,699,344 | B2 * | 4/2010 | Moriyama et al. | 280/775 |
| 2006/0043720 | A1 | 3/2006 | Sawada et al. | |
| 2006/0162989 | A1 * | 7/2006 | Yamada | 180/444 |
| 2007/0137379 | A1 | 6/2007 | Sanji et al. | |
| 2008/0035416 | A1 * | 2/2008 | Imagaki et al. | 180/444 |
| 2008/0106086 | A1 * | 5/2008 | Shimoda | 280/775 |
| 2008/0217097 | A1 * | 9/2008 | Segawa | 180/444 |

FOREIGN PATENT DOCUMENTS

| EP | 1 561 669 | 8/2005 |
| EP | 1 666 333 | 6/2006 |
| JP | 62 72871 | 5/1987 |
| JP | 4 34137 | 8/1992 |
| JP | 2000 62623 | 2/2000 |

(Continued)

*Primary Examiner* — Kevin Hurley
*Assistant Examiner* — Marc A Scharich
(74) *Attorney, Agent, or Firm* — Oblon, Spivak, McClelland, Maier & Neustadt, L.L.P.

(57) ABSTRACT

A steering apparatus includes: a steering wheel, a shaft that transfers a rotational force from the steering wheel, a steering column that supports the shaft, a fitting bracket with which the steering column is fitted to a vehicle body-side member, a rotational force assist mechanism that applies a rotational force to the shaft, and a tilt mechanism that changes a tilt angle of the steering column. The fitting bracket includes a support portion that tiltably supports the steering column, and a secured portion secured to the vehicle body-side member. The fitting bracket is structured in such a manner that the secured portion and the support portion lie in the same plane perpendicular to the rotational axis of the shaft when the steering column is at a predetermined tilt angle that is within a range of tilt angle achievable by using the tilt mechanism.

14 Claims, 8 Drawing Sheets

FOREIGN PATENT DOCUMENTS

| | | |
|---|---|---|
| JP | 2000 62624 | 2/2000 |
| JP | 2002 2502 | 1/2002 |
| JP | 2002 370653 | 12/2002 |
| JP | 2005 8022 | 1/2005 |
| JP | 2005 14886 | 1/2005 |
| JP | 2005 104429 | 4/2005 |
| JP | 2005 280678 | 10/2005 |
| JP | 2006 21569 | 1/2006 |
| JP | 2006 103391 | 4/2006 |
| JP | 2007 62477 | 3/2007 |
| WO | 2005 030557 | 4/2005 |

* cited by examiner

FIG.8

STEERING APPARATUS

BACKGROUND OF THE INVENTION

1. Field of the Invention

The invention relates to a steering apparatus for a vehicle.

2. Description of the Related Art

A tilt mechanism that changes a tilt angle of a steering column based on the posture and physique of a driver is described in, for example, Japanese Patent Application Publication No. 2002-2502 (JP-A-2002-2502), Japanese Patent Application Publication No. 2005-8022 (JP-A-2005-8022), and Japanese Patent Application Publication No. 2006-21569 (JP-A-2006-21569). A supporting structure in which such tilt mechanism is included and a steering column is fitted to a vehicle body is described in, for example, Japanese Patent Application Publication No. 2002-370653 (JP-A-2002-370653). In the supporting structure described in JP-A-2002-370653, a vehicle body-side bracket and a column-side bracket are fastened to each other by swaging a pivoted member, which is used as the shaft axis when the steering column is tilted, using a pin.

Japanese Examined Utility Model Registration Application Publication No. 04-34137 (JP-UM-B-04-34137) describes a tilt steering apparatus provided with a buffer member that minimizes vibration and noise caused by a contact between a movable bracket, which supports a steering column, and a restriction member due to a spring force when the steering column is flipped up.

Japanese Patent Application Publication No. 2000-62624 (JP-A-2000-62624) describes a steering apparatus that includes a steering column support portion with enhanced rigidity. Such high rigidity of the steering column support portion is achieved by providing a column-side bracket having an elaborated shape.

There is a so-called electric power steering apparatus that generates assist torque using a motor fitted to a column shaft portion and a speed reducer during a steering operation. The electric power steering apparatus detects the information on a steering operation performed by a driver and generates assist torque that proceeds in the direction in which a steering wheel is turned by the driver, thereby alleviating the driver's burden of turning the steering wheel.

However, when a shaft that is housed in a steering gear cannot be moved any more, for example, when a tire contacts a curbstone or when a steering wheel is turned to the fullest extent, if a force to turn the steering wheel is further applied by the driver, assist torque is applied to a column shaft. In this case, because the column shaft cannot rotate any more, a reaction force due to a drive power generated by the motor is applied to a securing portion that secures a bracket which supports the steering column to a vehicle body.

Therefore, a bracket needs to be designed with the strength thereof taken into account so that the bracket is reliably secured to the vehicle body even if such reaction force is applied to the securing portion. Especially when a bracket is used to support a steering column provided with a tilt mechanism, the bracket needs to be designed in such a manner that sufficiently high strength is ensured despite provision of the tilt mechanism. This causes an increase in the size of the bracket.

SUMMARY OF THE INVENTION

The invention realizes a fitting member that supports a steering column with a more compact structure in a steering apparatus in which a tilt mechanism is provided and a rotational force that differs from a rotational force from a steering wheel is generated during a steering operation.

A first aspect of the invention relates to a steering apparatus which includes a steering wheel that is used to steer a vehicle, a shaft that is secured at an end portion to the steering wheel, and that transfers a rotational force from the steering wheel, a steering column that rotatably supports the shaft, a fitting member with which the steering column is fitted to a vehicle body-side member, and which tiltably supports the steering column, a rotational force assist mechanism that is secured to the steering column and that applies a rotational force which differs from the rotational force from the steering wheel to the shaft, and a tilt mechanism that changes a tilt angle of the steering column. The fitting member includes a support portion that pivotably supports the steering column so that the steering column is tiltable with respect to the fitting member, and a secured portion that is secured to the vehicle body-side member, and the fitting member is structured in such a manner that the secured portion and the support portion lie in the same plane that is perpendicular to the rotational axis of the shaft when the steering column is at a predetermined tilt angle that is within a range of tilt angle achievable by using the tilt mechanism.

If a rotational force generated by the rotational force assist mechanism is applied in such a direction that the shaft is not able to rotate any more, the rotational force assist mechanism attempts to rotate in the opposite direction due to a reaction force. When the rotational force assist mechanism is secured to the steering column, the reaction force is transferred also to the steering column, and a force, which proceeds in such a direction that the fitting member is twisted (for example, the direction of rotation of the shaft), is generated at the support portion of the fitting member, which supports the steering column. Even if a force that proceeds in such a direction that the fitting member is twisted is generated due to a force applied to the support portion, the fitting member should not be deformed largely. Therefore, countermeasures to prevent large deformation of the fitting member need to be taken.

According to the first aspect of the invention, the fitting member is structured in such a manner that the secured portion and the support portion lie in the same plane that is perpendicular to the rotational axis of the shaft when the steering column is at the predetermined tilt angle that is within the range of tilt angle achievable by using the tilt mechanism. Therefore, it is possible to lower the possibility that a force which proceeds in such a direction that the fitting member is twisted is generated at the fitting member that is fitted to the vehicle body-side member by the secured portion due to a force applied to the support portion, or the fitting member is not twisted. Therefore, it is no longer necessary to use a member with an increased thickness to achieve a sufficient strength of the fitting member so that the fitting member is not twisted. As a result, it is possible to realize the fitting member with a more compact structure.

The steering apparatus according to the first aspect of the invention may further include a force receiving portion that is secured to the outer periphery of the shaft and that receives the rotational force from the rotational force assist mechanism. The force receiving portion, the secured portion and the support portion may lie in the same plane that is perpendicular to the rotational axis of the shaft when the steering column is at the predetermined tilt angle that is within the range of tilt angle achievable by using the tilt mechanism. When the force receiving portion, the secured portion and the support portion lie in the same plane that is perpendicular to the rotational axis of the shaft, generation of the force which proceeds in such a direction that the fitting member is twisted is more efficiently suppressed. Therefore, it is possible to realize the fitting member with a more compact structure.

In the first aspect of the invention, the rotational force assist mechanism may include a motor, a worm gear that is secured to the rotational axis of the motor, and a wheel gear that is secured to the outer periphery of the shaft in such a manner that the wheel gear is meshed with the worm gear, thereby serving as the force receiving portion. With this structure, it is possible to arrange the rotational force assist mechanism in a smaller space near the shaft. As a result, flexibility in the layout of the steering apparatus is increased.

In the first aspect of the invention, the fitting member may be structured in such a manner that the direction in which the secured portion is fitted to the vehicle body-side member does not intersect with the direction in which the support portion supports the steering column. With this structure, for example, even if the support portion projects from the fitting member, it is possible to suppress reduction in workability when the fitting member is fitted to the vehicle body-side member.

In the first aspect of the invention, the fitting member may be formed of a first plane portion and a second plane portion that extends perpendicularly to the first plane portion, the second plane portion may be arranged so as to be oblique to one of sides of the first plane portion, a through-hole in which a fastening member is fitted when the support portion supports the steering column may be formed in the first plane portion; and a through-hole in which a bolt is fitted when the secured portion is fitted to the vehicle body-side member may be formed in the second plane portion.

In the first aspect of the invention, the fitting member may be structured in such a manner that the direction in which the secured portion is fitted to the vehicle body-side member is oblique to a direction in which the support portion supports the steering column. With this structure, for example, even if the support portion projects from the fitting member, it is possible to suppress reduction in workability when the fitting member is fitted to the vehicle body-side member.

In the first aspect of the invention, the fitting member may be formed of a first plane portion and a second plane portion, and an obtuse angle may be formed between the first plane portion and the second plane portion.

In the first aspect of the invention, the fitting member may include a first fitting member and a second fitting member that are provided on opposite sides of the steering column and that support the steering column, and the axial direction of the support portion of each of the first fitting member and the second fitting member, which supports the steering column, may be in parallel with a fitting face of each of the first fitting member and the second fitting member, which is fitted to the vehicle body-side member.

In the first aspect of the invention, the predetermined tilt angle may be a center value of the range of tilt angle achievable by using the tilt mechanism. With this structure, the possibility that a force that proceeds in such a direction that the fitting member is twisted is generated at the fitting member is lowered, because the predetermined tilt angle matches the center value of the range of tilt angle of the steering column.

In the first aspect of the invention, the predetermined tilt angle may be a tilt angle at which the steering column is fitted to the fitting member. Thus, even if the tilt angle of the steering column is not adjusted when the vehicle is used, it is possible to minimize the possibility that a force, which proceeds in such a direction that the fitting member is twisted, is generated at the fitting member.

A second aspect of the invention relates to a steering apparatus which includes a steering wheel that is used to steer a vehicle, a shaft that is secured at an end portion to the steering wheel, and that transfers a rotational force from the steering wheel, a steering column that rotatably supports the shaft, a fitting member with which the steering column is fitted to a vehicle body-side member, and which tiltably supports the steering column, and a rotational force assist mechanism that is secured to the steering column and that applies a rotational force which differs from the rotational force from the steering wheel to the shaft. The fitting member includes a support portion that supports the steering column, and a secured portion that is secured to the vehicle body-side member, and the fitting member is structured in such a manner that the secured portion and the support portion lie in the same plane that is perpendicular to the rotational axis of the shaft.

According to the second aspect of the invention, the fitting member is structured in such a manner that the secured portion and the support portion lie in the same plane that is perpendicular to the rotational axis of the shaft. Therefore, it is possible to lower the possibility that a force which proceeds in such a direction that the fitting member is twisted is generated at the fitting member that is fitted to the vehicle body-side member by the secured portion due to a force applied to the support portion, or the fitting member is not twisted. Therefore, it is no longer necessary to use a member with an increased thickness to achieve a sufficient strength of the fitting member so that the fitting member is not twisted. As a result, it is possible to realize the fitting member with a more compact structure.

The steering apparatus according to the second aspect of the invention may further include a force receiving portion that is secured to the outer periphery of the shaft and that receives the rotational force from the rotational force assist mechanism. The force receiving portion, the secured portion and the support portion may lie in the same plane that is perpendicular to the rotational axis of the shaft. When the force receiving portion, the secured portion and the support portion lie in the same plane that is perpendicular to the rotational axis of the shaft, generation of the force which proceeds in such a direction that the fitting member is twisted is more efficiently suppressed. Therefore, it is possible to realize the fitting member with a more compact structure.

In the second aspect of the invention, the rotational force assist mechanism may include a motor, a worm gear that is secured to a rotational axis of the motor, and a wheel gear that is secured to the outer periphery of the shaft in such a manner that the wheel gear is meshed with the worm gear, thereby serving as the force receiving portion.

In the second aspect of the invention, the fitting member may be structured in such a manner that the direction in which the secured portion is fitted to the vehicle body-side member does not intersect with the direction in which the support portion supports the steering column.

In the second aspect of the invention, the fitting member may be formed of a first plane portion and a second plane portion that extends perpendicularly to the first plane portion, the second plane portion may be arranged so as to be oblique to one of sides of the first plane portion, a through-hole that is used when the support portion supports the steering column may be formed in the first plane portion, and a through-hole that is used when the secured portion is fitted to the vehicle body-side member may be formed in the second plane portion.

In the second aspect of the invention, the fitting member may be structured in such a manner that the direction in which the secured portion is fitted to the vehicle body-side member is oblique to the direction in which the support portion supports the steering column.

In the second aspect of the invention, the fitting member may be formed of a first plane portion and a second plane portion, and an obtuse angle may be formed between the first plane portion and the second plane portion.

In the second aspect of the invention, the fitting member may include a first fitting member and a second fitting member that are provided on opposite sides of the steering column and that support the steering column, and the axial direction of the support portion of each of the first fitting member and the second fitting member, which supports the steering column, may be in parallel with a fitting face of each of the first fitting member and the second fitting member, which is fitted to the vehicle body-side member.

In the second aspect of the invention, the predetermined tilt angle may be a tilt angle at which the steering column is fitted to the fitting member.

According to the aspects of the invention described above, it is possible to realize the fitting member that supports the steering column with a more compact structure.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Hereafter, example embodiments of the invention will be descried with reference to the accompanying drawings. Note that, the same or corresponding portions will be denoted by the same reference numerals, and description on the portions having the same reference numerals will be provided only once below.

Figure 1:
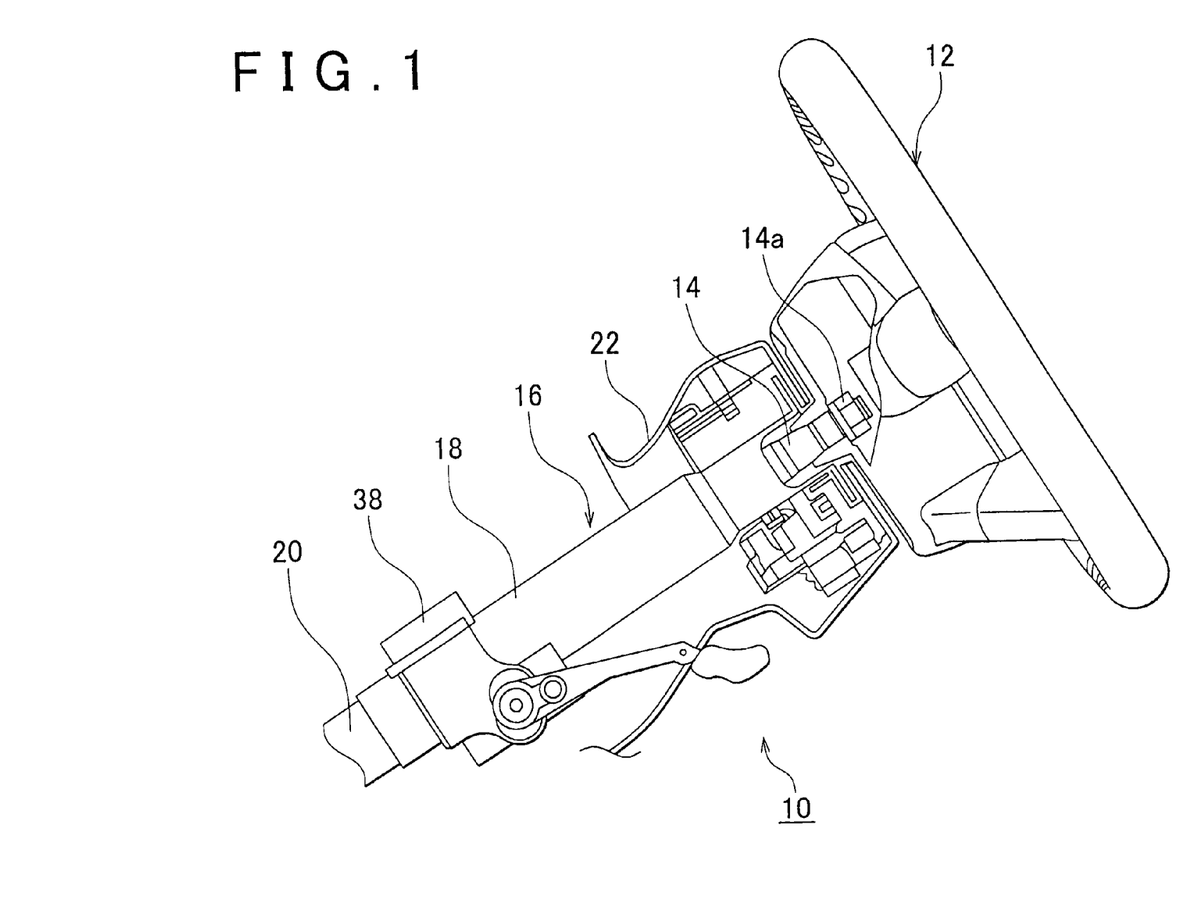
FIG. 1 is a view showing a part of a steering apparatus according to a first embodiment of the invention.

Hereafter, a first embodiment of the invention will be described. FIG. 1 is a view showing a part of a steering apparatus according to the first embodiment of the invention.

A steering apparatus 10 includes a steering wheel 12, a steering shaft 14, a steering column 16, a universal joint (not shown), etc. The steering wheel 12 includes an annular rim, a hub that is fitted in the steering shaft 14, and spokes that connect the rim to the hub. A driver turns the steering wheel 12 to steer a vehicle. The steering wheel 12 is secured to the upper end portion of the steering shaft 14 with a nut 14a. The steering shaft 14 transfers a rotational force from the steering wheel 12. The steering shaft 14 is structured so as to rotate together with the steering wheel 12. The universal joint is arranged at the lower end portion of the steering shaft 14, and is connected to a component positioned on a steering gear box side.

The steering column 16 includes an outer tube (outer cylinder) 18 and an inner tube (inner cylinder) 20. The steering shaft 14 is rotatably supported by the outer tube 18 and the inner tube 20. The outer tube 18 is secured to, for example, a vehicle frame via a fitting bracket 38. A portion of the steering column 16, which is secured to the steering wheel 12, is covered with a column cover 22. The column cover 22 is provided with various switches such as an ignition key switch. The steering column 16 is provided with a tilt mechanism (described later in detail), a telescopic mechanism, etc.

Figure 2:
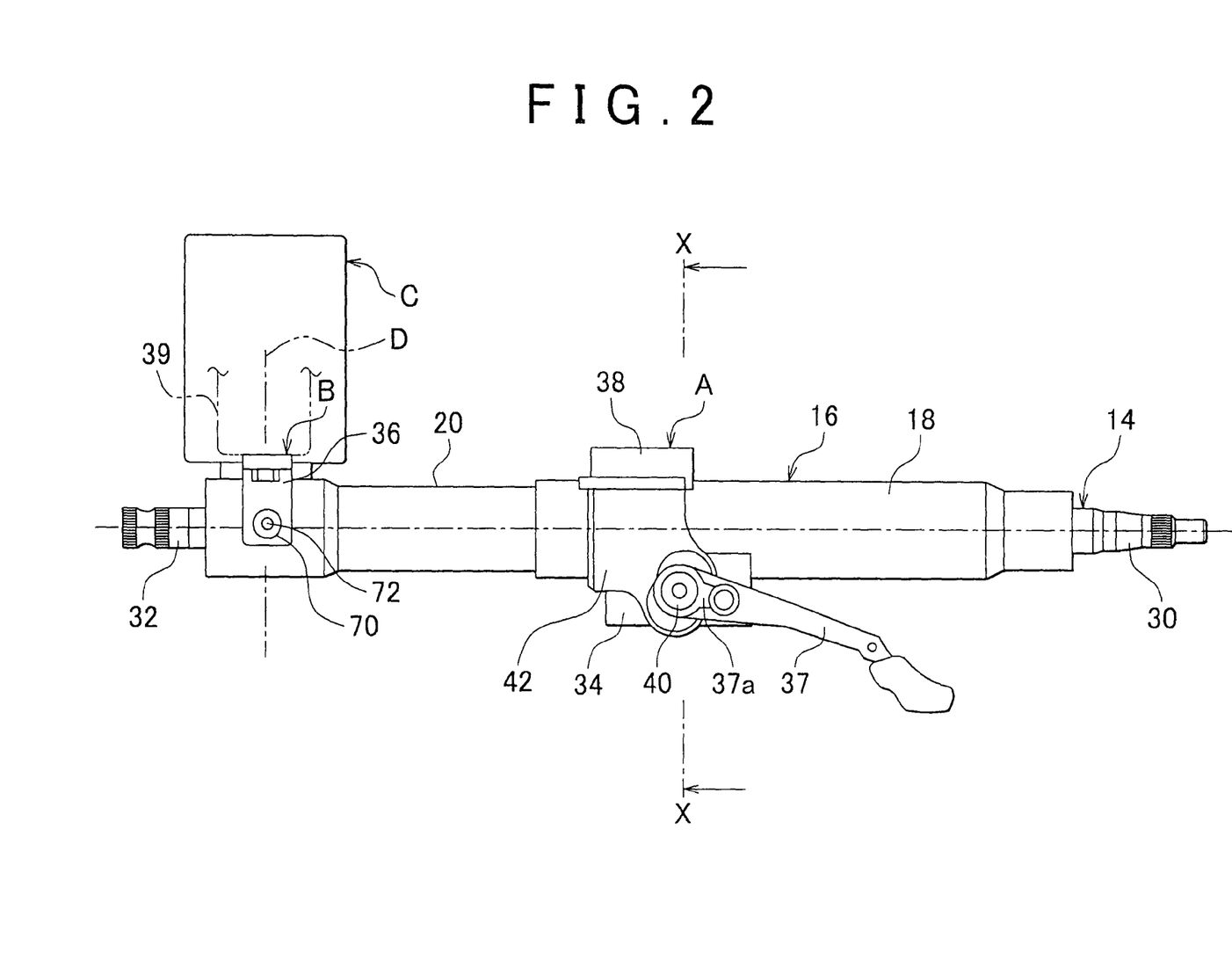
FIG. 2 is a side view showing the external structure of a steering column.
Figure 3:
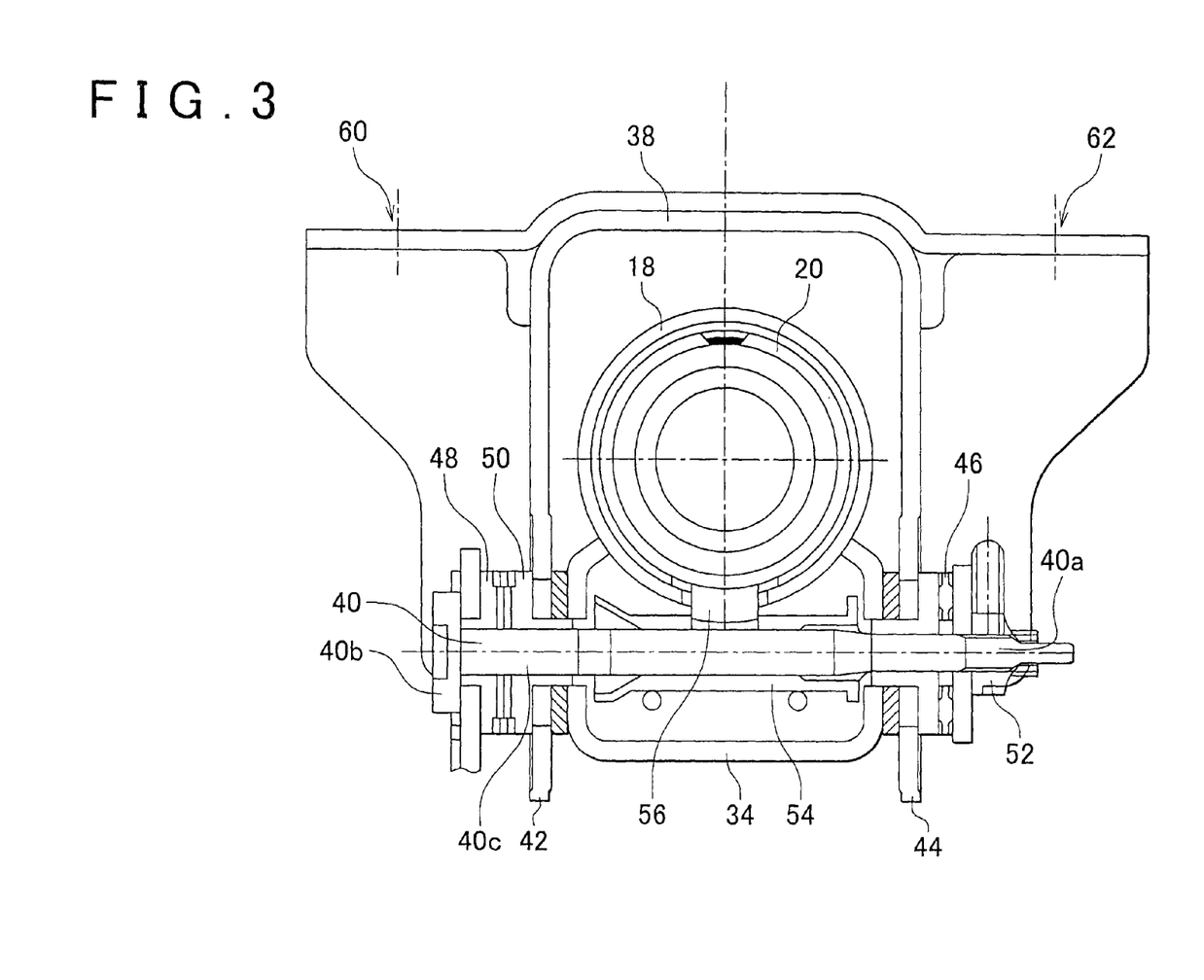
FIG. 3 is a cross-sectional view taken along the line X-X in FIG. 2.

FIG. 2 is a side view showing the external structure of the steering column 16. FIG. 3 is a cross-sectional view taken along the line X-X in FIG. 2. The steering shaft 14 includes an upper shaft 30 and a lower shaft 32 that telescope in the direction in which the axis of the steering column 16 extends (hereinafter, referred to as "column axis direction") and that transfer torque. The steering column 16, which rotatably supports the steering shaft 14 and which telescopes in the column axis direction, includes the outer tube 18 and the inner tube 20.

The upper shaft 30 is supported by the outer tube 18 via a bearing (not shown) in such a manner that the upper shaft 30 is rotatable but immovable in the column axis direction with respect to the outer tube 18. The upper shaft 30 is fitted at a right end portion in FIG. 2 to the steering wheel 12 in such a manner that the upper shaft 30 rotates together with the steering wheel 12. The lower shaft 32 is rotatably supported by the inner tube 20 via a bearing (not shown). The lower shaft 32 is fitted at a left end portion in FIG. 2 to an intermediate shaft (not shown), which telescopes and transfers torque, via a universal joint (not shown). The intermediate shaft is connected to the steering gear box (not shown) via a universal joint (not shown).

The outer tube 18 is fitted at the lower end portion to the upper end portion of the inner tube 20 in such a manner that the outer tube 18 is slidable in the column axis direction. The outer tube 18 is fitted at a column-side bracket 34, which is secured to the lower end portion of the outer tube 18, to a vehicle body-side bracket that is secured to a portion of a vehicle body (not shown) via an upper support mechanism A that adjusts the tilt angle of the steering column 16 and the amount by which each of the steering column 16 and the steering shaft 14 telescopes. The column-side bracket 34 is secured integrally to the outer tube 18, and constitutes a part of the steering column 16. The inner tube 20 is fitted at a fitting bracket 36, which is secured to the lower end portion of the inner tube 20, to a vehicle body-side member 39, which is a part of the vehicle body, via a lower support mechanism B. That is, the fitting bracket 36 functions as a fitting member that is used to fit the steering column 16 to the vehicle body-side member 39.

The upper support mechanism A includes a tilt mechanism and a telescopic mechanism that are formed integrally with each other. The tilt mechanism permits or restricts the tilting movement of the steering column 16 to adjust the tilt angle of the steering wheel 12 that is fitted to the upper shaft 30. The telescopic mechanism permits or restricts the telescopic movement of the steering shaft 14 and the steering column 16 in the column axis direction to adjust the position of the steering wheel 12 in the column axis direction.

The upper support mechanism A includes the fitting bracket 38 that is fitted to the vehicle body-side bracket in such a manner that the fitting bracket 38 is detachable from the vehicle body-side bracket if the fitting bracket 38 is moved forward. In addition, the upper support mechanism A includes a fastening bolt 40 with which the column-side bracket 34 is fastened to or unfastened from the fitting bracket 38 (when the column-side bracket 34 is unfastened from the fitting bracket 38, the tilt movement of the steering column 16 and the telescopic movement of the steering shaft 14 and the steering column 16 are adjustable), a thrust bearing 46, cam plates 48 and 50, a nut 52, an operation lever 37, a collar 54, an eccentric cam 56, etc.

The fitting bracket 38 supports the column-side bracket 34 in such a manner that the column-side bracket 34 is tiltable in the up-and-down direction of the vehicle and is movable in the column axis direction. The fitting bracket 38 includes paired left and right arms 42 and 44, and paired fitting portions 60 and 62 that are arranged above the arms 42 and 44, respectively. The fitting bracket 38 is fitted via a resin capsule and a metal collar to the vehicle body-side bracket with fitting bolts that are fitted in slit holes formed in the fitting portions 60 and 62. The fitting bolts are fitted to weld nuts that are secured to the vehicle body-side bracket in advance.

The fastening bolt 40 is fitted in paired left and right arc-shaped through-holes (not shown) that are formed in the arms 42 and 44 of the fitting bracket 38 and paired left and right linear through-holes that are formed in the column-side bracket 34. The arc-shaped through-holes formed in the arms 42 and 44 are tilt long holes each having a shape of an arc. The center of a circle which includes this arc matches the pivot point of the lower support mechanism B shown in FIG. 1. The tilt angle of the steering column 16 is adjusted using the arc-shaped through-holes as the tilt range. The linear through-holes formed in the column-side bracket 34 are linear telescopic long holes formed along the column axis direction. With these linear through-holes, the steering shaft 14 and the steering column 16 are allowed to telescope.

The thrust bearing 46 is arranged between the right arm 44 of the fitting bracket 38 and the nut 52, and fastened to the right arm 44 and the nut 52 with the fastening bolt 40. The thrust bearing 46 allows the fastening bolt 40 and the nut 52 to rotate together with each other. The nut 52 is secured to a screw portion 40a of the fastening bolt 40. The cam plates 48 and 50 and the operation lever 37 are arranged between the left arm 42 of the fitting bracket 38 and a head portion 40b of the fastening bolt 40, and are fitted onto a shaft portion 40c of the fastening bolt 40.

The left cam plate 48 and the operation lever 37 are connected integrally with each other, fitted onto the shaft portion 40c of the fastening bolt 40, and rotatable with respect to the right cam plate 50. The right cam plate 50 is rotatable on the shaft portion 40c of the fastening bolt 40 and movable in the direction in which the axis of the fastening bolt 40 extends (hereinafter, referred to as "bolt axis direction"). The right cam plate 50 is unable to rotate with respect to the left linear through-hole formed in the column-side bracket 34 and movable in the column axis direction.

The cam plates 48 and 50 convert the pivot motion of the operation lever 37 into the movement in the axial direction of the fastening bolt 40, whereby the fastening bolt 40 and nut 52 are placed in the fastened state (state in which the shaft portion 40c of the fastening bolt 40 is pulled at a position between the head portion 40b of the fastening bolt 40 and the nut 52) or the loosened state (state in which the shaft portion 40c of the fastening bolt 40 is loosened at a position between the head portion 40b of the fastening bolt 40 and the nut 52). Because the detailed structure of the cam plates 48 and 50 is known, description thereof will not be provided below.

The operation lever 37 is connected to the head portion 40b of the fastening bolt 40 using a connection plate 37a. The operation lever 37 pivots together with the fastening bolt 40. When the operation lever 37 pivots counterclockwise in FIG. 1, the pivot motion of the operation lever 37 is converted into the movement of the fastening bolt 40 in the bolt axis direction by the cam plates 48 and 50. Thus, the cam plates 48 and 50 move away from each other, and the fastening bolt 40 and the nut 52 are placed in the fastened state. As a result, a frictional force that is obtained between the column-side bracket 34 and the fitting bracket 38 increases. Thus, the column-side bracket 34 is locked to the fitting bracket 38 due to friction engagement, and the tilting motion and the column-axis direction movement of the steering column 16 are restricted.

On the other hand, when the operation lever 37 pivots clockwise in FIG. 1, the pivot motion of the operation lever 37 is converted into the movement of the fastening bolt 40 in the bolt axis direction by the cam plates 48 and 50. Thus, the cam plates 48 and 50 come closer to each other, and the fastening bolt 40 and the nut 52 are placed in the loosened state. As a result, the frictional force is reduced. Thus, lock-up of the column-side bracket 34 to the fitting bracket 38 due to friction engagement is cancelled, whereby the tilting motion and the column-axis direction movement of the steering column 16 are permitted.

The collar 54 is fitted integrally onto the shaft portion 40c of the fastening bolt 40 in the column-side bracket 34 in such a manner that the collar 54 is not able to rotate and is immovable in the bolt axis direction. The collar 54 rotates together with the fastening bolt 40 in accordance with the pivot motion of the operation lever 37. The eccentric cam 56 is fitted integrally to the collar 54. The eccentric cam 56 is engaged with or disengaged from the lower face of the upper end portion of the inner tube 20 through an opening formed in the outer tube 18. The eccentric cam 56 rotates together with the fastening bolt 40 in accordance with the pivot motion of the operation lever 37.

The lower support mechanism B tiltably (pivotably) supports the inner tube 20 of the steering column 16. The lower support mechanism B is formed of a collar 70 that is rotatably fitted in a through-hole formed in the fitting bracket 36 that is secured to the lower end portion of the inner tube 20, and a fastening member 72, for example, a bolt, that secures the collar 70 to the inner tube 20.

Figure 4:
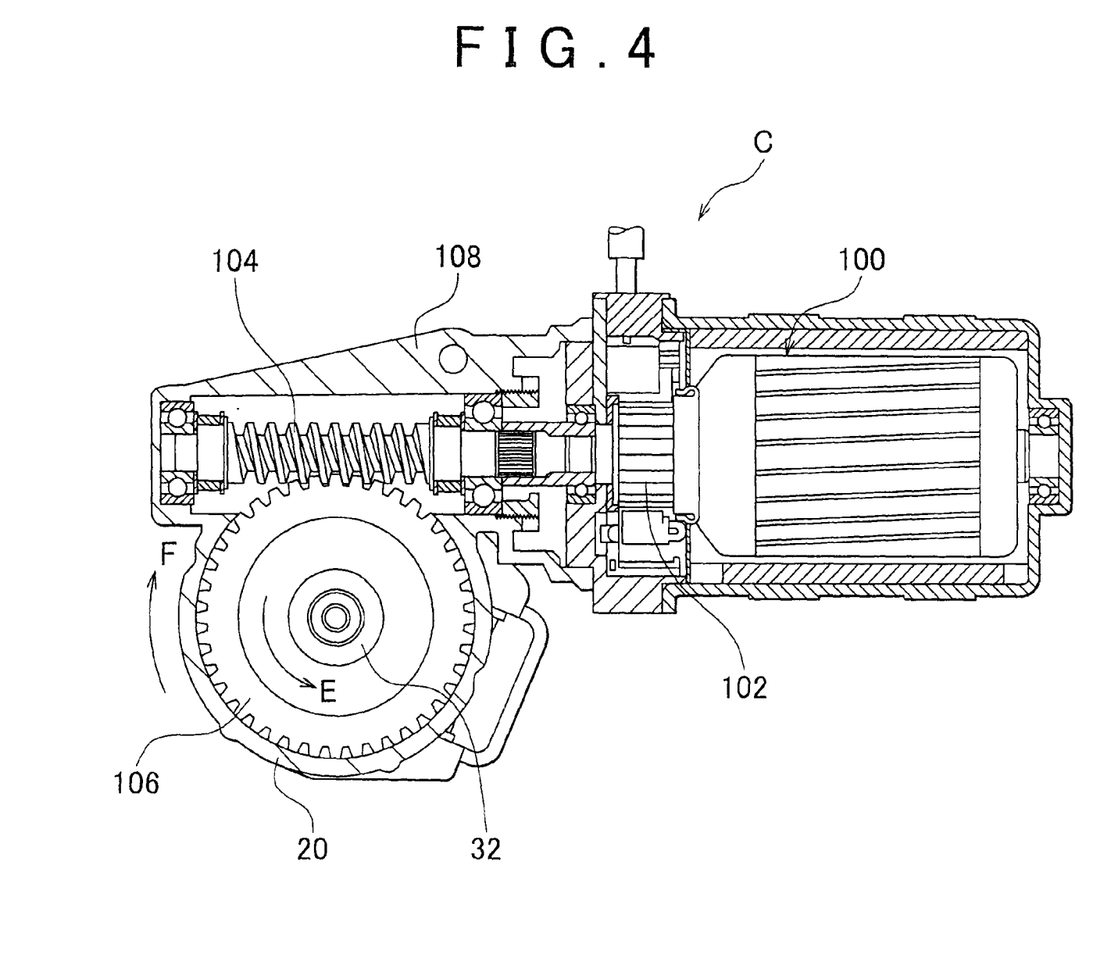
FIG. 4 is a cross-sectional view schematically showing a rotational force assist mechanism according to the first embodiment of the invention.

FIG. 4 is a cross-sectional view schematically showing a rotational force assist mechanism according to the first embodiment of the invention. The steering apparatus 10 according to the first embodiment of the invention includes a rotational force assist mechanism C that applies a rotational force, which differs from a rotational force from the steering wheel 12, to the shaft members such as the upper shaft 30 and the lower shaft 32.

The rotational force assist mechanism C includes a motor 100, a worm gear 104 that is arranged coaxially with a rotating shaft 102 of the motor 100, a wheel gear 106 that is fitted to the outer periphery of the lower shaft 32 in such a manner that the wheel gear 106 cannot rotate with respect to the lower shaft 32, a column housing 108 that houses these components, etc. The column housing 108 is formed integrally with the outer periphery of the inner tube 20.

The rotational axis of worm gear 104 is perpendicular to the rotational axis of the wheel gear 106. The worm gear 104 and the wheel gear 106 constitute a speed reduction mechanism. The torque generated by the motor 100 is increased in accordance with a speed reduction ratio by the worm gear 104 and the wheel gear 106, and the increased torque is transferred to the lower shaft 32. Thus, the rotational force assist mechanism C generates a rotational force, which differs from the rotational force from the steering wheel 12, on an as-required basis based on the information such as the steering angle and the steering amount of the steering wheel 12. In this way, the driver's burden of turning the steering wheel is alleviated.

Figure 5A:
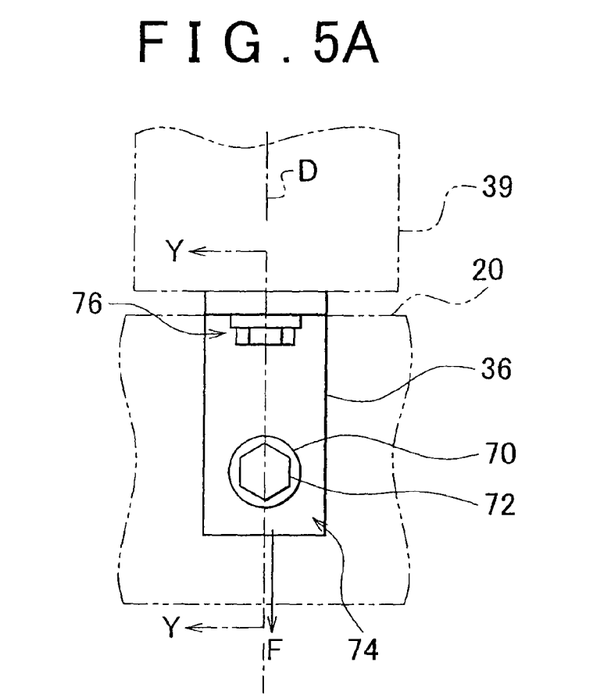
FIG. 5A is an enlarged side view showing main portions near a fitting bracket shown in FIG. 2.
Figure 5B:
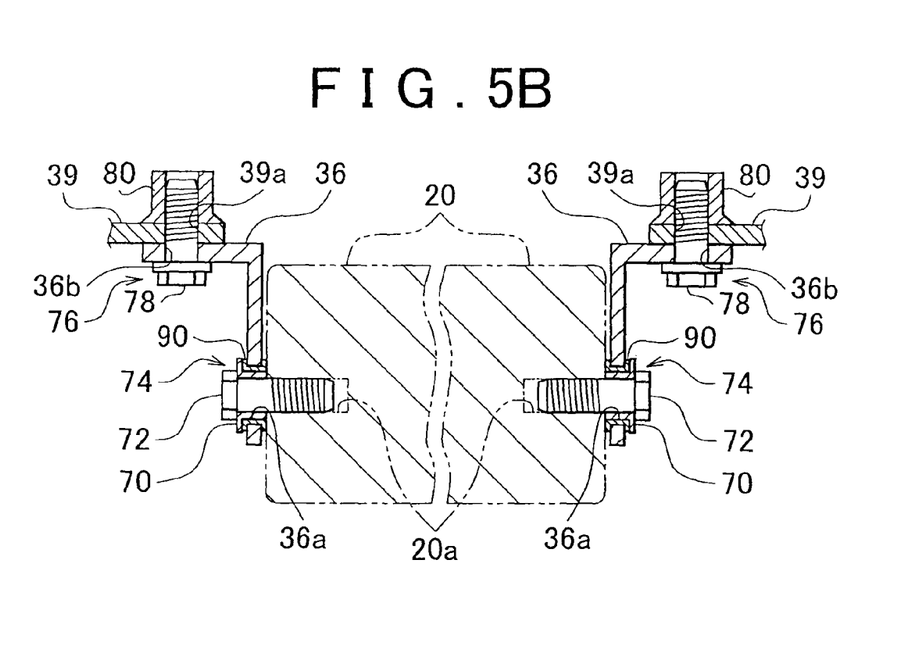
FIG. 5B is a cross-sectional view taken along the line Y-Y in FIG. 5A.

Next, the structure of the fitting bracket 36 will be described. FIG. 5A is an enlarged side view showing main portions near the fitting bracket 36 shown in FIG. 2. FIG. 5B is a cross-sectional view taken along the line Y-Y in FIG. 5A. FIG. 5B shows a pair of fitting brackets 36, that is, FIG. 5B shows not only one fitting bracket 36 but also the other fitting bracket 36 that faces the one fitting bracket 36 via the inner tube 20. Each fitting bracket 36 includes a support portion 74 that pivotably supports the steering column 16 so that the steering column 16 is tiltable with respect to the fitting bracket 36 in the up-and-down direction of the vehicle, and a secured portion 76 that is secured to the vehicle body-side member 39. The fitting bracket 36 is structured in such a manner that the secured portion 76 and the support portion 74 lie in the same plane D that is perpendicular to the rotational axis of the lower shaft 32 when the steering column 16 is at a predetermined tilt angle which is within a range of tilt angle achievable by using the tilt mechanism of the upper support mechanism A.

More specifically, each fitting bracket 36 is a substantially L-shaped member. A through-hole 36a is formed in one of plane portions that correspond to the sides of the L-shape. The through-hole 36a has a diameter that is large enough so that the collar 70 is fitted in the through-hole 36a with a slide member 90 fitted on the outer periphery of the collar 70. A through-hole 36b is formed in the other plane portion. The through-hole 36b has a diameter that is large enough so that a screw portion of a bolt 78 passes through the through-hole 36b. In addition, screw holes 20a are formed in the outer periphery of the inner tube 20.

The inner tube 20 is fitted to the fitting bracket 36 via the collar 70 while the screw hole 20a is aligned with the through-hole 36a formed in the fitting bracket 36. At this time, the slide member 90 is fitted on the outer periphery of the collar 70 by the fastening member 72.

Figure 8:
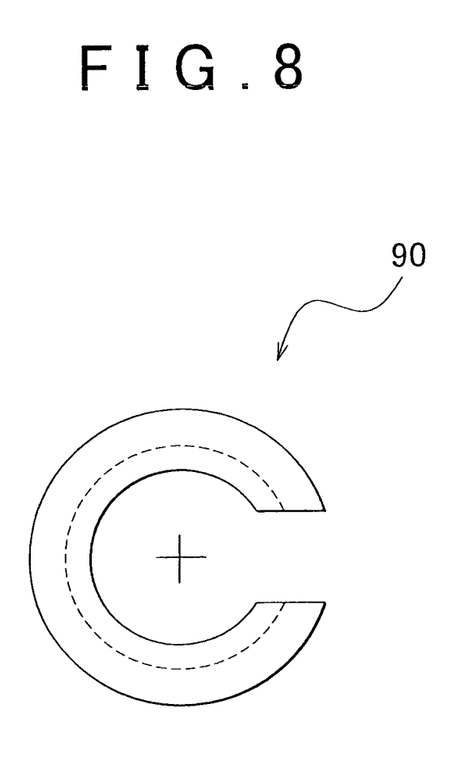
FIG. 8 is a top view showing a slide member shown in FIG. 5B.

FIG. 8 is a top view of the slide member 90 shown in FIG. 5B. The slide member 90 is a resin bush that has a U-shaped cross section which is realized by partially denting the outer peripheral face as shown in FIG. 5B, and has a shape that is obtained by cutting off a portion of a circle as shown in FIG. 8. Because the slide member 90 slides smoothly with respect to the collar 70 and the inner tube 20, the slide member 90 is rotatable with respect to the collar 70 and the inner tube 20. Thus, the fitting bracket 36 pivotably supports the inner tube 20 using the support portion 74 so that the steering column 16 is tiltable in the up-and-down direction of the vehicle. The outer diameter of the collar 70 is slightly smaller than the diameter of the through-hole 36a of the fitting bracket 36. The collar 70 is rotatably supported by the fitting bracket 36. Therefore, the steering column 16 that includes the inner tube 20 is tiltable (pivotable) in the up-and-down direction of the vehicle using the support portion 74 of the fitting bracket 36 as the pivot point.

The fitting bracket 36 is fastened at the secured portion 76 to the vehicle body-side member 39 with the bolt 78 and a nut 80 while the through-hole 36b is aligned with a through-hole 39a of the vehicle body-side member 39. Thus, the fitting bracket 36 and the vehicle body-side member 39 are secured to each other so as to be immovable with respect to each other.

Next, a description will be provided on a force that is applied to the fitting bracket 36 if a force to turn the steering wheel 12 is applied to the steering wheel 12 when the upper shaft 30 and the lower shaft 32 cannot rotate any more, in the steering apparatus 10 in which the inner tube 20 is supported using the fitting bracket 36 described above and which is secured to the vehicle body-side member 39.

For example, if a rotational force, which is generated by the rotational force assist mechanism C and which proceeds in such a direction that the lower shaft 32 cannot rotate anymore (for example, a direction indicated by an arrow E), is applied to the lower shaft 32 as shown in FIG. 4, the wheel gear 106 that is secured to the lower shaft 32 cannot move because the lower shaft 32 cannot rotate. Therefore, the worm gear 104 that is in mesh with the wheel gear 106 receives a reaction force that corresponds to the rotational force generated by the motor 100 from the wheel gear 106.

As a result, a force that rotates the inner tube 20 in the direction indicate by an arrow F is applied to the rotational force assist mechanism C that includes the worm gear 104 and the column housing 108 which houses the motor 100 and the inner tube 20 that is formed integrally with the column housing 108. The inner tube 20 that constitutes a part of the steering column 16 is supported by the fitting bracket 36 at the support portion 74 as shown in FIG. 5. Therefore, a force that proceeds in the direction indicated by an arrow F (see FIG. 5A) is generated at the support portion 74 of the fitting bracket 36.

In the steering apparatus 10 according to the first embodiment of the invention, the fitting bracket 36 is structured in such a manner that the secured portion 76 and the support portion 74 lie in the same plane D that is perpendicular to the rotational axis of the lower shaft 32 when the steering column 16 is at a predetermined tilt angle which is within the range of tilt angle achievable by using the tilt mechanism of the upper support mechanism A (for example, in the state shown in FIG. 2 or FIG. 5). Therefore, a force, which proceeds in such a direction that the fitting bracket 36 is twisted due to a force applied to the support portion 74, is not likely to be generated at the fitting bracket 36 that is fitted to the vehicle body-side member 39 at the secured portion 76, or the fitting bracket 36 is not twisted. Therefore, it is no longer necessary to use a member with an increased thickness or a member having a more complicated shape to achieve a sufficient strength of the fitting bracket 36 so that the fitting bracket 36 is not twisted. As a result, it is possible to realize the fitting bracket with a more compact structure.

The steering apparatus 10 according to the first embodiment of the invention includes the wheel gear 106 that serves as a force receiving portion which is secured to the outer periphery of the lower shaft 32 and which receives a rotational force from the rotational force assist mechanism C, as shown in FIG. 4. The steering apparatus 10 is structured in such a manner that the wheel gear 106, the secured portion 76 and the support portion 74 lie in the same plane D that is perpendicular to the rotational axis of the lower shaft 32 when the steering column 16 is at a predetermined tilt angle which is within a range of tilt angle achievable by using the tilt mechanism of the upper support mechanism A. Thus, when at least the wheel gear 106, the secured portion 76 and the support portion 74 lie in the same plane D that is perpendicular to the rotational axis of the lower shaft 32, the possibility that a force, which proceeds in such a direction that the fitting bracket 36 is twisted, is generated at the fitting bracket 36, is lower. As a result, it is possible to realize the fitting bracket with a more compact structure.

The rotational force assist mechanism C according to the first embodiment of the invention includes the motor 100, the worm gear 104 that is secured to the rotating shaft 102 of the motor 100, and the wheel gear 106 that is secured to the outer periphery of the lower shaft 32 in such a manner that the wheel gear 106 is in mesh with the worm gear 104. Therefore, it is possible to arrange the rotational force assist mechanism C in a smaller space near the lower shaft 32. As a result, flexibility in the layout of the steering apparatus 10 is increased.

In the steering apparatus 10 according to the first embodiment of the invention, preferably, the above-described predetermined tilt angle is set to the center value of the range of tilt angle achievable by using the tilt mechanism of the upper support mechanism A. Because the predetermined tilt angle matches the center value of the range of tilt angle of the steering column 16, there is only a low possibility that a force, which proceeds in such a direction that the fitting bracket 36 is twisted, is generated at the fitting bracket 36, even if the tilt angle of the steering column 16 is changed to a certain extent by the tilt mechanism.

Alternatively, the predetermined tilt angle may be a tilt angle at which the steering column 16 is fitted to the fitting bracket 36 during production of the vehicle. Thus, even if the tilt angle of the steering column 16 is not adjusted when the vehicle is used, it is possible to minimize the possibility that a force, which proceeds in such a direction that the fitting bracket 36 is twisted, is generated at the fitting bracket 36.

Figure 6A:
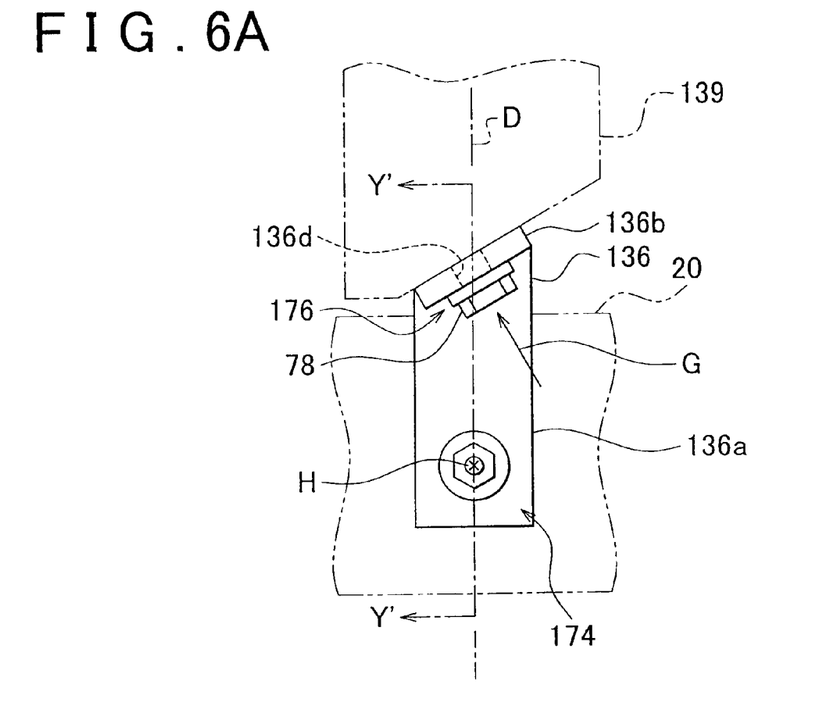
FIG. 6A is an enlarged side view showing main portions near a fitting member according to a second embodiment of the invention.
Figure 6B:
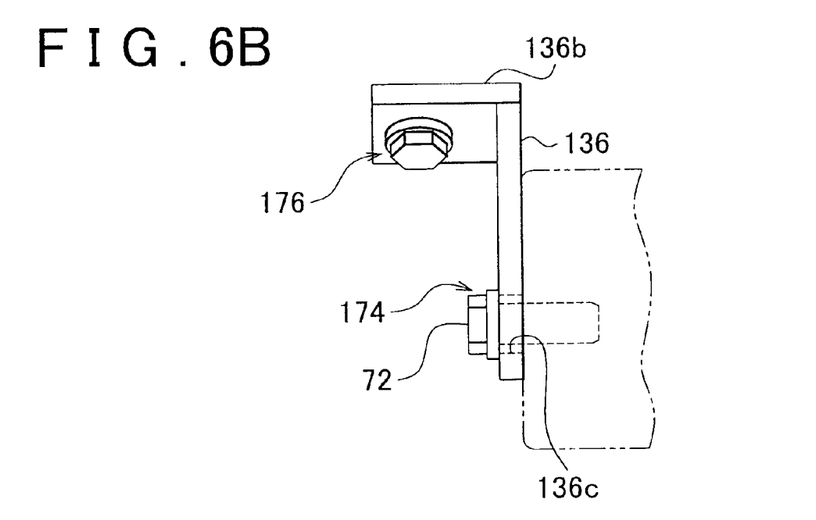
FIG. 6B is a cross-sectional view taken along the line Y'-Y' in FIG. 6A.

Hereafter, a second embodiment of the invention will be described. FIG. 6A is an enlarged side view showing main portions near a fitting member according to the second embodiment of the invention. FIG. 6B is a cross-sectional view taken along the line Y'-Y' in FIG. 6A. The structure of the fitting member and the portions near the fitting member will be described below. However, the features that are similar to those in FIG. 5 according to the first embodiment of the invention will not be described below.

A fitting bracket 136 includes a support portion 174 and a secured portion 176. The support portion 174 pivotably supports the steering column 16 so that the steering column 16 is tiltable in the up-and-down direction of the vehicle with respect to the fitting bracket 136. The secured portion 176 is secured to the vehicle body-side member 139. The fitting bracket 136 is structured in such a manner that the secured portion 176 and the support portion 174 lie in the same plane D that is perpendicular to the rotational axis of the lower shaft 32 when the steering column 16 is at a predetermined tilt angle which is within a range of tilt angle achievable by using the tilt mechanism of the upper support mechanism A.

More specifically, the fitting bracket 136 is formed of a rectangular plate-like plane portion 136a, and a plane portion 136b that extends perpendicularly to the plane portion 136a. The plane portion 136b is arranged so as to be oblique to one of the sides of the plane portion 136a. In the plane portion 136a, a through-hole 136c having a diameter that is slightly larger than the diameter of the collar 70 is formed so that the collar 70 is rotatable within the through-hole 136c. In the plane portion 136b, a through-hole 136d having a diameter that is large enough so that the screw portion of the bolt 78 passes through the through-hole 136d is formed.

Although not shown in FIG. 6, the inner tube 20 is fitted to the fitting bracket 136 via the collar 70 by the fastening portion 72 while the screw hole 20a (see FIG. 5) is aligned with the through-hole 136c of the fitting bracket 136.

The fitting bracket 136 is fastened at the secured portion 176 to the vehicle body-side member 139 with the bolt 78 and a nut (not shown) while the through-hole 136d is aligned with a through-hole (not shown) formed in the vehicle body-side member 139. Thus, the fitting bracket 136 and the vehicle body-side member 139 are secured to each other in such a manner that the fitting bracket 136 and the vehicle body-side member 139 are immovable with respect to each other.

According to the second embodiment of the invention, the fitting bracket 136 is structured in such a manner that the secured portion 176 and the support portion 174 lie in the same plane D that is perpendicular to the rotational axis of the lower shaft 32 when the steering column 16 is at a predetermined tilt angle which is within the range of tilt angle achievable by using the tilt mechanism of the upper support mechanism A (for example, in the state shown in FIG. 2 or FIG. 6). Therefore, when the fitting bracket 136 according to the second embodiment of the invention is used in the steering apparatus 10, a force, which proceeds in such a direction that the fitting bracket 136 is twisted due to a force applied to the support portion 174, is not likely to be generated at the fitting bracket 136 that is fitted to the vehicle body-side member 139 by the secured portion 176, or the fitting bracket 136 is not twisted. Therefore, it is no longer necessary to use a member with an increased thickness or a member having a more complicated shape to achieve a sufficient strength of the fitting bracket 136 so that the fitting bracket 136 is not twisted. As a result, it is possible to realize the fitting bracket 136 with a more compact structure.

In addition, the fitting bracket 136 according to the second embodiment of the invention is structured in such a manner that the direction indicated by an arrow G, in which the secured portion 176 is fitted to the vehicle body-side member 139, does not intersects with the direction indicated by an arrow H, in which the support portion 174 supports the steering column 16. With this structure, even if the support portion 174 projects from the fitting bracket 136, it is possible to suppress reduction in workability on the secured portion 176 when the fitting bracket 136 is fitted to the vehicle body-side member 139.

Figure 7:
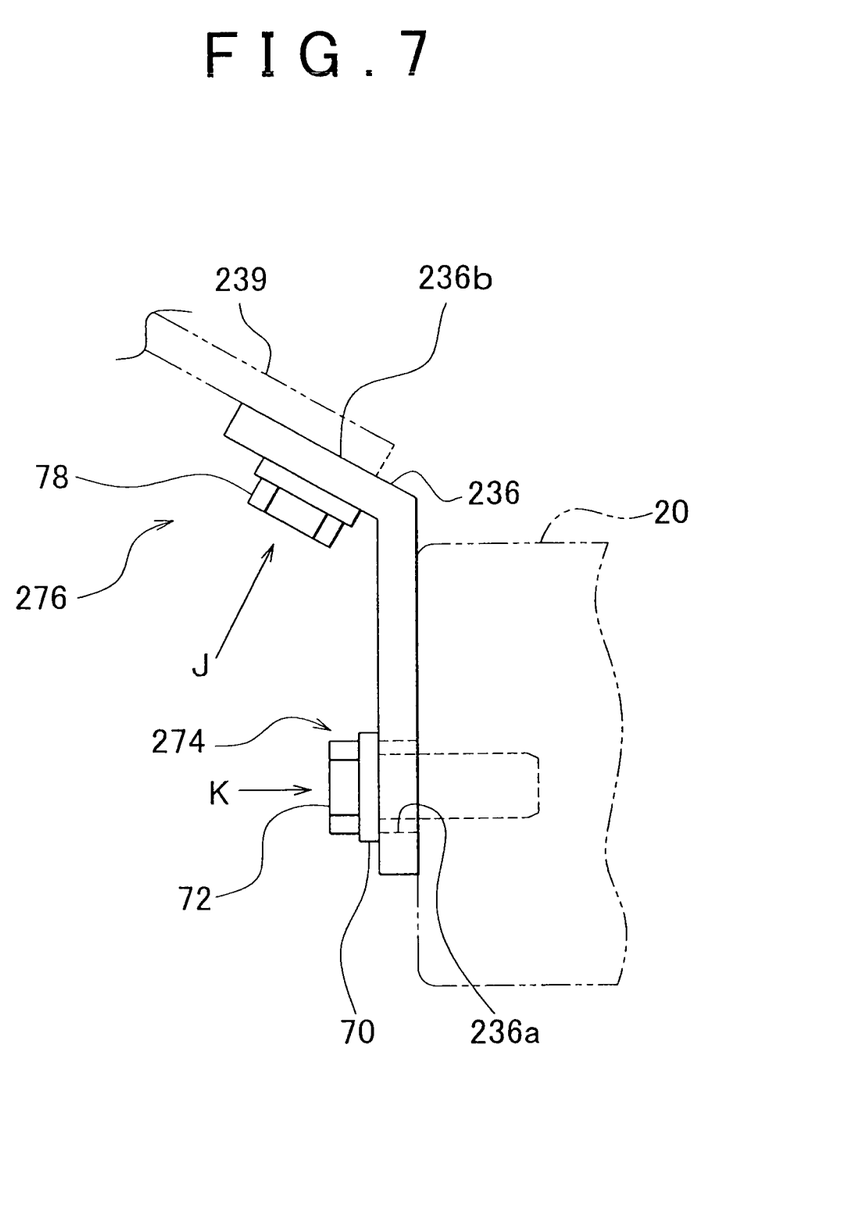
FIG. 7 is a front view showing main portions near a fitting member according to a third embodiment of the invention viewed from a steering wheel side.

Hereafter, a third embodiment of the invention will be described. FIG. 7 is a front view showing main portions near a fitting member according to the third embodiment of the invention when viewed from the steering wheel side. The structure of the fitting member and the portions near the fitting member will be described below. However, the features that are similar to those in FIGS. 5 and 6 according to the first and second embodiments of the invention will not be described below.

A fitting bracket 236 includes a support portion 274 and a secured portion 276. The support portion 274 pivotably supports the steering column 16 so that the steering column 16 is tiltable in the up-and-down direction of the vehicle with respect to the fitting bracket 236. The secured portion 276 is secured to a vehicle body-side member 239. The fitting bracket 236 is structured in such a manner that the secured portion 276 and the support portion 274 lie in the same plane D that is perpendicular to the rotational axis of the lower shaft 32 when the steering column 16 is at a predetermined tilt angle which is within a range of tilt angle achievable by using the tilt mechanism of the upper support mechanism A.

More specifically, the fitting bracket 236 is formed by bending a rectangular plate-like member in such a manner that an obtuse angle is formed between a plane portion 236a and a plane portion 236b, as shown in FIG. 7. Therefore, the fitting bracket 236 according to the third embodiment of the invention is structured in such a manner that the direction indicated by an arrow J, in which the secured portion 276 is fitted to the vehicle body-side member 239, is oblique to the direction indicated by an arrow K, in which the support portion 274 supports the steering column 16. Thus, even if the support portion 274 projects from the fitting bracket 236, there is only a low possibility of a contact with the fastening member 72 during a work on the secured portion 276 that is performed when the fitting bracket 236 is fitted to the vehicle body-side member 239. As a result, it is possible to suppress reduction in the workability.

In each embodiment of the described above, the steering apparatus includes the tilt mechanism. However, the invention may be applied to a steering apparatus that does not include a tilt mechanism. In this case, the steering apparatus is structured in such a manner that the secured portion 76 and the support portion 74 lie in the same plane that is perpendicular to the rotational axis of the steering shaft 14.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the scope of the invention.

The invention claimed is:

1. A steering apparatus comprising:
   a steering wheel that is used to steer a vehicle,
   a shaft that is secured at an end portion to the steering wheel, and that transfers a rotational force from the steering wheel,
   a steering column that rotatably supports the shaft,
   a fitting member with which the steering column is fitted to a vehicle body-side member, and which supports the steering column,
   a rotational force assist mechanism that is secured to the steering column and that applies a rotational force which differs from the rotational force from the steering wheel to the shaft, and
   a force receiving portion that is secured to an outer periphery of the shaft and that receives the rotational force from the rotational force assist mechanism,
   wherein:
   the fitting member comprises a support portion that supports the steering column, and a secured portion that is secured to the vehicle body-side member;
   the fitting member is structured in such a manner that the secured portion and the support portion and the force receiving portion lie in a same plane that is perpendicular to a rotational axis of the shaft;
   the fitting member is formed of a first plane portion and a second plane portion that extends perpendicularly to the first plane portion;
   the second plane portion is arranged so as to be oblique to one of sides of the first plane portion;
   a through-hole that is used when the support portion supports the steering column is formed in the first plane portion; and
   a through-hole that is used when the secured portion is fitted to the vehicle body-side member is formed in the second plane portion.

2. The steering apparatus according to claim 1, further comprising a tilt mechanism that changes a tilt angle of the steering column.

3. The steering apparatus according to claim 2, wherein the rotational force assist mechanism includes a motor, a worm gear that is secured to a rotating shaft of the motor, and a wheel gear that is secured to the outer periphery of the shaft in such a manner that the wheel gear is meshed with the worm gear, thereby serving as the force receiving portion.

4. The steering apparatus according to claim 2, wherein the fitting member is structured in such a manner that a direction in which the secured portion is fitted to the vehicle body-side member does not intersect with a direction in which the support portion supports the steering column.

5. The steering apparatus according to claim 2, wherein:
   the fitting member includes a first fitting member and a second fitting member that are provided on opposite sides of the steering column and that support the steering column; and
   an axial direction of the support portion of each of the first fitting member and the second fitting member, which supports the steering column, is in parallel with a fitting face of each of the first fitting member and the second fitting member.

6. The steering apparatus according to claim 2,
   wherein the fitting member is structured in such a manner that the secured portion, the support portion, and the force receiving portion, lie in a same plane that is perpendicular to a rotational axis of the shaft when the steering column is at a predetermined tilt angle that is within a range of tilt angle achievable by using the tilt mechanism, and
   wherein the predetermined tilt angle is a center value of the range of tilt angle achievable by using the tilt mechanism.

7. The steering apparatus according to claim 2,
   wherein the fitting member is structured in such a manner that the secured portion, the support portion, and the force receiving portion, lie in a same plane that is perpendicular to a rotational axis of the shaft when the steering column is at a predetermined tilt angle that is within a range of tilt angle achievable by using the tilt mechanism, and
   wherein the predetermined tilt angle is a tilt angle at which the steering column is fitted to the fitting member.

8. The steering apparatus according to claim 1, wherein the rotational force assist mechanism includes a motor, a worm gear that is secured to a rotating shaft of the motor, and a wheel gear that is secured to the outer periphery of the shaft in such a manner that the wheel gear is meshed with the worm gear, thereby serving as the force receiving portion.

9. The steering apparatus according to claim 1, wherein the fitting member is structured in such a manner that a direction in which the secured portion is fitted to the vehicle body-side member does not intersect with a direction in which the support portion supports the steering column.

10. The steering apparatus according to claim 1, wherein:
    the fitting member includes a first fitting member and a second fitting member that are provided on opposite sides of the steering column and that support the steering column; and
    an axial direction of the support portion of each of the first fitting member and the second fitting member, which supports the steering column, is in parallel with a fitting face of each of the first fitting member and the second fitting member.

11. A steering apparatus, comprising:
a steering wheel that is used to steer a vehicle,
a shaft that is secured at an end portion to the steering wheel, and that transfers a rotational force from the steering wheel,
a steering column that rotatably supports the shaft,
a fitting member with which the steering column is fitted to a vehicle body-side member, and which supports the steering column,
a rotational force assist mechanism that is secured to the steering column and that applies a rotational force which differs from the rotational force from the steering wheel to the shaft, and
a force receiving portion that is secured to an outer periphery of the shaft and that receives the rotational force from the rotational force assist mechanism,
wherein:
the fitting member comprises a support portion that supports the steering column, and a secured portion that is secured to the vehicle body-side member;
the fitting member is structured in such a manner that the secured portion and the support portion and the force receiving portion lie in a same plane that is perpendicular to a rotational axis of the shaft; and
the fitting member is structured in such a manner that a direction in which the secured portion is fitted to the vehicle body-side member is oblique to a direction in which the support portion supports the steering column.

12. The steering apparatus according to claim 11, further comprising a tilt mechanism that changes a tilt angle of the steering column.

13. A steering apparatus, comprising:
a steering wheel that is used to steer a vehicle,
a shaft that is secured at an end portion to the steering wheel, and that transfers a rotational force from the steering wheel,
a steering column that rotatably supports the shaft,
a fitting member with which the steering column is fitted to a vehicle body-side member, and which supports the steering column,
a rotational force assist mechanism that is secured to the steering column and that applies a rotational force which differs from the rotational force from the steering wheel to the shaft, and
a force receiving portion that is secured to an outer periphery of the shaft and that receives the rotational force from the rotational force assist mechanism,
wherein:
the fitting member comprises a support portion that supports the steering column, and a secured portion that is secured to the vehicle body-side member;
the fitting member is structured in such a manner that the secured portion and the support portion and the force receiving portion lie in a same plane that is perpendicular to a rotational axis of the shaft;
the fitting member is formed of a first plane portion and a second plane portion; and
an obtuse angle is formed between the first plane portion and the second plane portion.

14. The steering apparatus according to claim 13, further comprising a tilt mechanism that changes a tilt angle of the steering column.

* * * * *